Dec. 19, 1950     H. HURVITZ     2,534,820
RADAR AZIMUTH AND DISTANCE INDICATION RECORDER

Filed May 20, 1947

Inventor

Hyman Hurvitz

Patented Dec. 19, 1950

2,534,820

UNITED STATES PATENT OFFICE 2,534,820

RADAR AZIMUTH AND DISTANCE INDICATION RECORDER

Hyman Hurvitz, Washington, D. C., assignor, by direct and mesne assignments, of one-half to Panoramic Radio Corporation, New York, N. Y., a corporation of New York, and one-half to Marcel Wallace, doing business as Panoramic Laboratories, East Port Chester, Conn.

Application May 20, 1947, Serial No. 749,192

10 Claims. (Cl. 343—11)

This invention relates generally to recording systems and methods, and more particularly to methods and systems for plotting in permanent form values of variable parameters against azimuth.

This application is a continuation-in-part of my applications for Letters Patent of the United States Serial Number 743,975, filed on April 25, 1947, and entitled, Panoramic Azimuth Recorders, now Patent No. 2,516,389, granted July 25, 1950, and Serial Number 736,817, filed March 24, 1947, and entitled Recorders.

It is an object of the present invention to combine a pulse type distance measuring equipment with a recording equipment of novel design, the latter providing a plot in permanent form, and in polar coordinates, of the ranges of objects situated within the range of the measuring capabilities of the distance measuring equipment for all azimuthal angles.

It is a further object of the present invention to associate a space scanning recorder with a range scanning or range gating distance measuring equipment for simultaneous scanning of a record receiving line and of the ranges of one or more objects, the recorder being responsive to output signals derivable from the measuring equipment to provide a permanent mark at points along the line which are proportional to the ranges of the objects.

It is still a further object of the present invention, to provide a space scanning recorder in conjunction with a pulse type of range or distance measuring equipment, for providing a permanent azimuth versus range plot of the plan position type.

Still a further object of the present invention resides in the provision of a recorder for providing plots in polar coordinates of ranges of remote objects versus azimuthal angle, the distance measuring equipment being provided with a scanning range gate, and the recording equipment being provided with a radial line scanning and marking device, the polar angle of the line scanned by the scanning device being coordinated with the azimuthal directivity of the distance measuring equipment.

It is another object of the present invention to provide a novel recorder for recording in polar coordinates.

It is still another object of the present invention to provide a scanning recorder for plotting in polar coordinates and having means for scanning radially, the latter means being angularly positionable.

The above and still further objects, features and advantages of the invention will become apparent upon consideration of the following detailed description of a specific embodiment of the invention, especially when taken in conjunction with the accompanying drawings, wherein.

Figure 1:
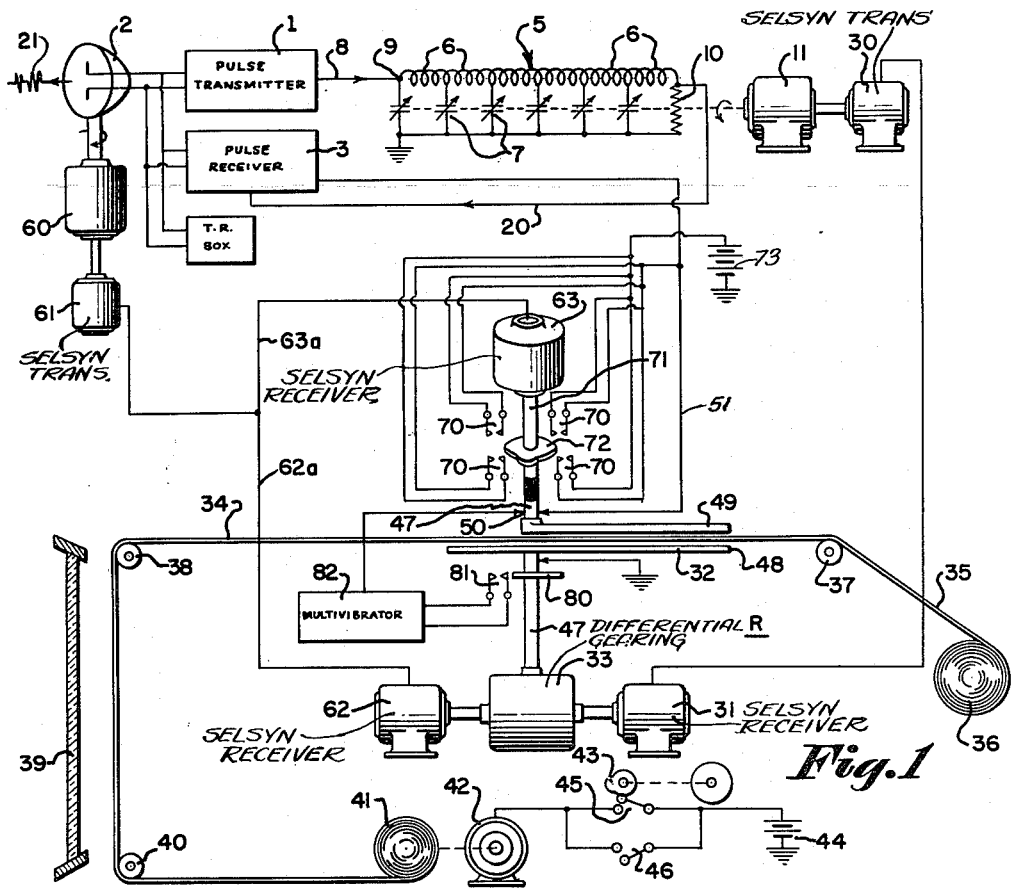
Figure 1 is a circuit diagram largely in terms of functional blocks, of an apparatus arranged in accordance with the invention, as well as certain characteristic features of a recorder constructed in accordance with the invention, and illustrated in conventionalized sectional view.

Referring now more specifically to the drawings, and particularly to Figure 1 thereof, a pulse type radar transmitter 1 is provided, which provides pulses of radio frequency energy, at a carrier frequency, a pulse frequency, and a pulse duration chosen in view of service requirements for the equipment, in accordance with principles which are well understood, per se. The output of the pulse transmitter 1 is applied to an antenna 2, of highly directional character, which serves to emit the energy provided by the transmitter 1 in a narrowly restricted beam. Objects which may be within the transmitted beam reflect or scatter the energy of the beam, or a portion thereof, and the scattered or reflected energy is intercepted by the antenna 1, and applied to a pulse receiving equipment 3 which detects same, and provides at its output, pulse signals. The pulse signals provided by the pulse receiver 3 are displaced in time position with respect to the times of pulse transmission, by a factor which is determinable from the distance or distances from the antenna 2 at which reflection or scattering of transmitted energy occurs, in view of the known velocity of travel of electro-magnetic energy.

In the more usual type of distance determining devices, operating on the principle of timing of reflected energy to determine distance or range, a cathode ray tube indicator with an extremely rapid time base has been utilized for measuring elapsed time. In order to provide a polar plot of ranges and azimuths, complicated apparatus has been required, in cathode ray indicators, for providing the required radial time scanning circuits in conjunction with the azimuthal scanning, each azimuthal angle being required to be explored in turn for energy reflecting objects.

Recording of the polar plot provided by the cathode ray indicator has been a difficult operation, and usually has been accomplished photographically. The apparatus of the present invention operates on novel principles to provide a direct mechanical recording in polar coordinates, of ranges and azimuths of radiant energy reflecting objects, and does so by means of apparatus which is inherently far simpler than is the cathode ray tube indicator.

It is necessary in the present invention to provide a range scanning apparatus, or a variable range gate, in conjunction with the transmitter and the receiver 3, since it is not feasible to design and construct mechanical recorders which are capable of operating at the speeds required to measure times of travel of electromagnetic energy, over relatively short distances. I have chosen to indicate the variable time gate, or as I prefer to denominate it, the scanning range gate, as an electrical low pass filter, which, as is well known, is capable of introducing a variable delay in transmission times of pulse energy. It is well known that the delay time of such a gate, identified in the drawings by the numeral 5 and comprising a plurality of series connected inductances 6 and of shunt connected capacitances 7, is determined by the capacity and inductance values of the components of the gate. Accordingly, by varying the values of the shunt capacitances 7 in a continuous fashion, a constantly varying time delay is introduced into pulses provided over the line 8 from the transmitter 1 to the input terminal 9 of the delay line 5. The delay line 5 is terminated in a resistance 10 which has the function of minimizing reflections from the far or output end of the line 5.

While I have chosen to disclose a delay line 5 in the form of a low pass filter, I realize that many other forms of such delay lines are available to the art. More complex forms of low pass filter than the simple form illustrated in the drawings may be availed of. Still further, liquid delay lines may be utilized, which introduce delays into signal transmission by passage of signals through a column of liquid, the length of which may be varied to vary delay time. Again, multivibrators form excellent time delay devices, the time at which a pulse appears at one point in a multivibrator circuit being determined in relation to the time of application of a control pulse, by the values of certain resistances and capacitances, which may be made variable, if desired, to provide a variable time delay and hence a variable time gate. While I am aware of the existence of the various types of delay lines above briefly described, I have dispensed with a more complete description and an illustration thereof to avoid undue complication of the disclosure, and rely upon the skill of the technician to select and apply that range gate which best suits the needs of particular situations.

Referring once more to Figure 1 of the drawings, the condensers 7 of delay line 5 are varied in capacitance by means of a drive motor 11, the speed of scanning being preferably adjusted with respect to the pulse rate, so that one complete scanning of range shall correspond to a large multiple of the time elapse between pulses.

The law of time variation of capacitance of the condensers 7 is arranged to be such that a linear law of delay time variation with respect to angular position of the condenser tuning shaft 12 is enforced, delay time increasing from a minimum value of substantially zero, and up to a value corresponding to the time of travel of electromagnetic energy from the antenna 2 to the maximum desired range of the range measuring equipment, and back to the antenna 2.

Figure 2:
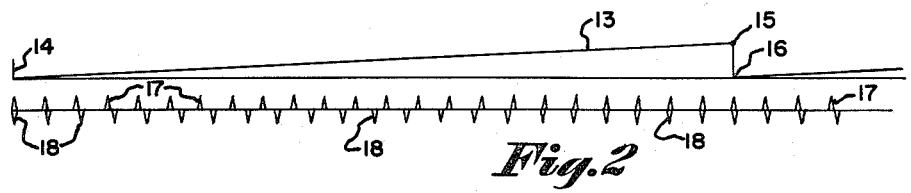
Figure 2 is a plot or graph for illustrating certain operating features of the invention.

The output of the delay line 7, as taken from the load or output resistance 10, comprises then a series of pulses, one for each transmitted pulse, but with continually retarded time positions for successive pulses. Referring specifically to Figure 2 of the drawings, the constantly increasing delay time introduced by the delay line 7 is plotted at 13, delay time increasing from zero at the initial point or region 14 of the plot, and increasing linearly to a point 15, at which the cycle of delay terminates, a new cycle being initiated immediately at 16. Immediately below the plot 13 is a further plot of emitted pulses 17, above a line 18, the emitted pulses being shown as equally spaced, for the sake of simplicity, although this is not essential, since the invention may be applied to random pulse radar or distance measuring equipment. The pulses as derived from the output resistance 10 of the delay line are illustrated by means of downward strokes with respect to line 17, as at 18, and successive delayed pulses are shown as downward strokes having slightly and successively increased delay time with respect to the emitted pulses to which they owe their existence.

I have shown in Figure 2 a relatively small ratio of pulse time separation to range scanning period, for the sake of simplicity of illustration. In actual and practical designs it may be desired to transmit 100, 1000 or even more pulses in the course of each range scanning period, the actual number involving a matter of choice in view of many other factors of design.

The output of the delay line 5, as developed across the output resistance 10 is applied to the pulse receiver 3, in gain increasing relation thereto, over a lead, 20, the receiver 2 being normally maintained, in the absence of gain increasing signal, at relatively low gain, so as to be quite insensitive, or totally inoperative. Upon advent at the receiver 3, of each pulse 21 of gain increasing voltage the receiver is for a short interval adjusted to its most sensitive condition, in which it is suitable for reception and detection of pulses of reflected energy and thus for the performance of its function in the present system.

Due to the continuously and periodically increasing delay times imposed on the gain control pulses 21, the receiver is caused to increase its gain at like continuously and periodically increasing time positions, and hence is operative to receive signals from sequentially increasing ranges or distances during a range scanning cycle.

The range scanning drive motor 11 is mechanically coupled with a Selsyn generator 30 which applies signal to a Selsyn repeater 31, located at a recorder R, and the latter applies its motion to a spiral line scanner 32, via a differential gearing 33, the special scanner 32 being located under a flat expanse of record receiving surface 34, which may be part of a long relatively narrow paper strip 35, treated chemically to provide a permanent record or mark upon passage of current therethrough. The strip 35 is stored in roll form, at 36, and is pulled over rollers 37 and 38, past a viewing window 39, over a roll 40, and on to a motor driven feed roll 41, the latter being actuated by an electric drive motor 42, which is intermittently operated to feed successive lengths of paper from recording position, as at 34, to viewing position, as at 43, and thence on the storing roll 41, by rotation of the roll 41 in proper sense.

During a recording operation the strip 35 remains stationary, the paper feed mechanism being caused to operate at relatively long intervals, say five or ten minutes, to feed a clear expanse of strip to the recording position 34. Time control of feeding may be effected most simply by means of a clock controlled cam 43, which closes a circuit from a source of power 44, to the motor 42, by means of a cam controlled switch 45, at the desired intervals, and for the time required, to effect the desired extent of paper feed during each paper feeding operation. A manually operable switch 46 is also provided in parallel with the time controlled switch 45 to enable paper feed under the complete control of the operator or monitor of the instrument, when the clock controlled intervals are found to be unsuitable.

Figure 3:
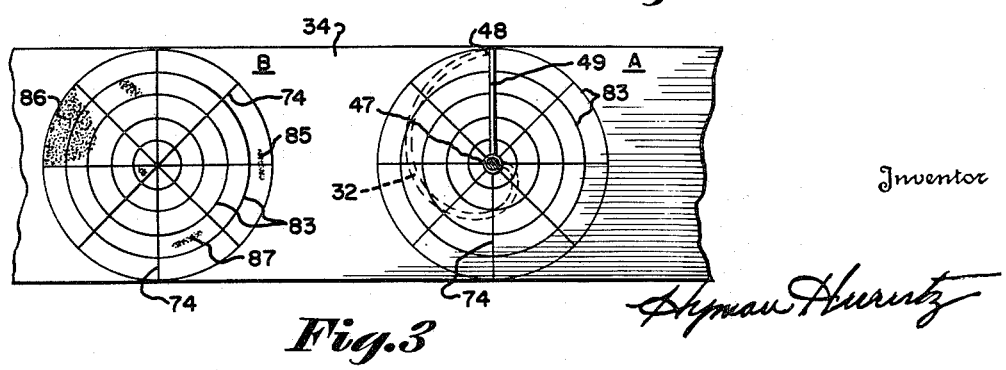
Figure 3 is a plan view of the recorder mechanism of Figure 1, in part, as well as of recordings provided in accordance with the invention.

Referring now to Figure 3 of the drawings, in conjunction with Figure 2, the spiral scanner 32 is seen to be mounted in a central shaft 47, and to take the form of a relatively thin metallic wire, which develops from the shaft 47 as a center, in the form of a true spiral of a single turn, and having a constant rate of change of radius with respect to angle, termination 48 of the spiral occurring on the same radius as does the initiation thereof. The reference numeral 49 denotes a linear marker which is located above the strip 34, so that the strip 34 is located between the line scanner 32 and the marker 49, and the marker 49 being electrically conducting, recording is accomplished by applying to the marker 49 by means of a brush 50 a voltage, derived over lead 51 from the output of pulse receiver 3, the current flow resulting from application of voltage to marker 49, over a circuit which passes through the strip 34, to the scanner 32 and thence to ground over a brush 51. The marker 49 is angularly positionable, as will appear as the description proceeds, but its angular position is relatively slow with respect to the rotative speed of the scanner 32, and may be assumed negligible to a first approximation, for the purposes of the immediate discussion. For example, the scanner 32 may rotate at 15 revolutions per second, whereas the marker 49 may rotate at an angular velocity of 5 or 10° per second. If then we assume the marker 49 to be stationary it will be clear that as the scanner 32 rotates the point of intersection of the line scanner 32 and of the marker 49, travels at uniform velocity along the marker 49, completing a scan of the marker 49 once for each revolution of the line scanner 32. Since the instantaneous point of intersection of the marker 49 and the scanner 32 represents the instantaneous potential marking or recording position of the recorder R, and since the motion of the scanner 32 is synchronized with the range scanning action of receiver 3 and delay line 5, by virtue of the Selsyn system comprising Selsyn generator 30 and Selsyn repeater 31, it will be clear that as the distance measuring equipment comprising transmitter 1, receiver 3, and variable delay line 5 scans a sequentially increasing series of distances or ranges, that the recorder scans radially a similarly increasing series of radial recording positions, and that upon occurrence of a reflecting object at any given range, a signal will be applied from the receiver 3, over lead 51, to the recorder R, which will produce a record or mark at a radial distance corresponding with or porportional to the said range.

The antenna 2 is rotated at a uniform and relatively slow speed by means of an azimuth scanning motor 60, in order to vary the directivity of the radiation pattern of the antenna 2, and to provide range measurements for all possible azimuthal angles, by successive range scanning of continously varying azimuthal angles. The motion of the antenna 2 is transferred, by means of a Selsyn generator 61, to Selsyn repeaters 62 and 63, joined to generator 61 by leads represented by the lines 62a and 63a respectively.

The Selsyn repeater 63 actuates the marking arm 49, and maintains its angular position always in identical angular relation with the antenna 2. Since the line scanner 32 operates equally well to scan ranges in a given direction regardless of the position of the marker arm 49, and since recordings can be produced only on the line occupied by the marker arm 49, records are produced along successive angularly displaced radii as the marker arm 49 follows the rotative motion of the antenna 2.

The Selsyn repeater 62 introduces into the rotary motion of the line scanner 32 a phase correction which is required by reason of the motion of the marker arm 49, by compounding its motion with that of the range Selsyn repeater 31 in the differential gearing 33. Referring to Figure 3 of the drawings, it will be evident that with the marker arm 49 in the position shown, that maximum range recording occurs with the line scanner 32 in the position illustrated. We may assume, furthermore, that the range scanning motor 11 is so positioned, at the same instant, as to cause the delay network 5 to introduce maximum delay. Under these circumstances correct recording of range and azimuth will occur. Now assume that the marker arm 49 has shifted its position 180°, every other condition remaining identical. Obviously, with the delay network 5 set for maximum range, the recorder is adjusted for recording zero range. The position of the line scanner 32 must then be modified by 180° to effect correction. Similar conclusions will be reached for any other angle which the marker arm 49 may assume. It is necessary, in order to retain proper operation of the recorder of the present invention, that the line scanner 32 be maintained at all times in proper phase with respect to the angular position of the marker arm 49, and to envisage what such a requirement entails we have only to assume a given invariable setting of delay time in the range scanning network 5, and a corresponding unvarying setting of line scanner 32, and to assume that the angular position of the marker arm varies constantly, for a full 360° of rotation. To maintain the line scanner 32 in proper relative position with respect to the marker arm 32, it is necessary to vary the line scanner in synchronism with the marker arm 49. For maximum range, for example, the point 48 of the line scanner 32 must follow the marker arm 49 and retain its relative position thereto.

In normal operation of the recorder, when range as well as azimuth is being scanned, it is necessary to superimpose on the line scanning motion of the scanner 32 an angular scanning motion corresponding identically with that of the marker arm 49. A convenient mechanism for effecting the superimposition is provided by the differential gear 33, which is an expedient of quite conventional character for the purpose stated, and which is therefore not illustrated nor explained in detail, in the present specification.

Reviewing now briefly the operation of the present system, pulses are transmitted by the transmitter 1 in a given azimuth, and are reflected by objects located within the range of the transmitter, to a pulse receiver 3. The receiver is gated in range, for a continually varying range, extending from zero to a maximum value, by the action of the scanning range gate 5, so that for each instant of time in each range scanning cycle signals reflected only from one predetermined range may be received by the receiver 3. A recorder R is provided which includes a radial line scanner 32 which scans a radial line defined by an angle marker arm 49, in synchronism with the range scanning action of the range scanner 5. Output signals from receiver 3 are caused to pass from the marker arm 49 through a record receiving surface 34 to the device 32 and thence to ground, creating a mark on the paper due to its passage, at the point of intersection of arm 49 and line scanner 32.

The marker arm 49 is controlled in respect to its angular position in correspondence with the azimuthal orientation of the antenna 2, so that for each azimuthal orientation of the antenna a series of ranges is scanned by the transmitter 1, the receiver 3 and the range scanner 5, and the radial line scanner 32 operating in conjunction with the angularly positionable marker arm 49, provides marks at radial distances along the scanned line corresponding with the measured ranges.

As the antenna 2 slowly rotates to provide measurements in successively displaced azimuths, the marker arm 49 likewise rotates, and range recordings are provided for the various azimuths at corresponding polar angles on the record receiving surface 34.

It will be realized that marks indicating range and azimuth of remote objects have no meaning, and are not susceptible of interpretation, except in relation to calibration marks.

Azimuthal calibration marks may be imposed on the record receiving surface 32 by means of a series of cam operated, normally open microswitches 70, located at intervals about the rotary shaft 47, on which is mounted the azimuth marker arm 49, a cam 72 being secured immovably to the shaft 71, and acting as switch closer. As the shaft 71 rotates the switches 70 are closed in succession and for times equal at least to two complete scanning operations of the line scanner 32, by the cam 72. Closure of any of the switches 70 causes application to the lead 51 of a potential, derived from source 73, which is adequate to cause recording. As the line scanner 32 rotates there is generated a radial line 74 on the record receiving surface 34, corresponding with the angular position of that switch 70 which is currently closed. Switches 70 may be displaced in any desired angular relationship about the shaft 71, in accordance with the number of calibration markers desired. I have illustrated use of marker generating switches at mutual angular displacement of 90°, for purposes of simplicity of illustration.

Range markers may be provided in the form of concentric circles having the same center as the radial angle markers 74, hereinbefore referred to, by providing a multivibrator or frequency multiplier, synchronized by rotations of the shaft 47, and generating a fixed number of equally spaced pulses for each complete rotation of the said shaft. To accomplish this result a cam 80 is secured to the shaft 47, which impinges upon and momentarily closes once in each revolution of the shaft 47, a switch 81, which makes a synchronizing circuit for the multivibrator 82. The latter may be designed, in one specific example of the invention, to provide six marker pips or output pulses, in response to each input, control or synchronizing pulse, these pips being equally spaced, and timed to provide recorder responses or marks at radial intervals on the surface 34 corresponding with 10 miles of range, the maximum range of the equipment being assumed to be 50 miles and the initial marker being at zero range. The rotation of the arm 49 being relatively slow, and the dimensions of each recorded dot being finite, the range circles appear ultimately as completely closed circles 83, despite the fact that they are actually composed of a large number of independent dots. In order to effect recording of the range circles the output of the multivibrator is applied to the lead 51, which serves also to convey to the recorder signals derived from the pulse receiver 3 and from the angular calibrations.

Reference to Figure 3 discloses two discrete records, one denoted by the letter A being in process of formation, and B representing a completed record. Referring to the record denoted B, a series of plots of plan position of various objects is displayed, including an object 85, which may be an aircraft located in relative bearing due north, at a range of about 55 miles, a large land mass 86 located at a range of 40 miles, and bearing S by W; and an object at range 25 miles, bearing ENE.

By watching the development of a polar plot in the course of time, as it is being made, the actual relative course between the recorder and all other objects may be observed over long periods of time, and the progress of any desired object observed and its present position compared with past positions by study of a permanent record.

In the course of naval battles, for example, the relative locations of targets in the past, their present locations, and the fact that they have been obliterated, if that be the case, will be evident in terms of an unbiased and impartial record; in fact, the entire course of naval battles may be recorded for the perusal of future historians, as viewed from each of the participating craft.

The value of equipment of the character above described for producing maps and charts from aircraft can hardly be overestimated, and while the disclosure as presented relates to devices for obtaining records of relative bearing, true bearing may be obtained for map making purposes and the like by combining the bearing of the antenna 2 relative to a moving craft, with the true bearing of the craft as determined by means of a gyro, in a manner well known per se, and the marker 49 may be oriented accordingly to represent true rather than relative bearing.

While I have described and illustrated one specific embodiment of the present invention, it will be clear that variations and modifications of the general arrangement disclosed and of its details may be resorted to without departing from the true spirit and scope of the invention, as defined in the appended claims.

What I claim and desire to secure by Letters Patent of the United States is:

1. In combination, a pulse transmitter, an adjacent pulse receiver for receiving pulses transmitted by said transmitter and returned from remote objects after delays in transmission having a correspondence with the ranges of said objects from said transmitter, means for controlling said receiver for receiving said pulses only when returned from a remote object at a single selectable range, means for periodically varying said single selectable range over a continuous set of values, a recorder for recording a polar plot of range versus azimuth of said objects, said recorder comprising an angularly orientable scanner for scanning in succession differently directed substantially radial lines of said polar plot, a directive receiving antenna coupled to said receiver, means for orienting said angularly orientable scanner along a radius of said polar plot corresponding with the directivity of said antenna, means for synchronizing scanning of said scanner with variations of said single selectable range by said means for periodically varying said single selectable range, and means for applying output signals derived from said receiver for actuating said recorder to mark said record receiving surface, at points selected by said scanner.

2. The combination in accordance with claim 1 wherein is further provided means for establishing a series of predetermined recorded range and azimuth representative co-ordinate markings on said record receiving surface.

3. The combination in accordance with claim 1 wherein is further provided pulse generating means local to said recorder, for applying to said recorder for recording on said record receiving surface pulses representative of predetermined ranges in predetermined azimuthal directions.

4. In combination, a directive range scanning distance measuring equipment for scanning a succession of ranges at a first predetermined relatively rapid rate of scan, said range scanning distance measuring equipment comprising a pulse transmitter and a pulse receiver, means for gating said receiver to receive pulses transmitted from said pulse transmitter and reflected to said pulse receiver from remote objects for a single range only, and means for continuously periodically adjusting said gating means, continuously to vary the magnitude of said single range at said first predetermined rate of scan, means for varying the directivity of said distance measuring equipment at a second relatively slow predetermined rate, a recorder for recording a polar plot and having a stationary record receiving surface, an elongated radial recording arm, means for rotating said radial recording arm with respect to said stationary record receiving surface at said second predetermined rate to sweep out a circle thereon having the radius of said radial recording arm, a scanner for repetitively scanning identical portions of said elongated recording arm at said first predetermined rate during successive angular positions thereof, and in synchronism with variation of said single range, and means for imposing a record on said record receiving surface at points of intersection of said line scanner and of said recording arm in response to signals deriving from said pulse receiver.

5. The combination in accordance with claim 4 wherein is further provided means for imposing on said record receiving surface recordings occurring at a predetermined series of said points of intersection defining predetermined radial directions and predetermined range circles.

6. In combination, a pulse transmitter for transmitting recurrent pulses, an adjacent normally inoperative pulse receiver for receiving said pulses after return thereof from remote objects and after delay in transmission bearing correspondence with ranges of said remote objects, means for rendering said receiver operative for receiving said pulses only when returned from a remote object at a predetermined selectable range, means for periodically varying said selectable range, said last means comprising a pulse delay line having a variable delay time, an input circuit and an output circuit for said delay line, means for applying said first mentioned recurrent pulses to said input circuit, means for applying delayed pulses derived from said output circuit to render said receiver operative and means for periodically varying the delay time of said pulse delay line over a range of values, a recorder for recording a polar plot of range versus azimuth of said objects, said recorder comprising an angularly orientable scanner for scanning in succession differently directed substantially radial lines of said polar plot, a directive receiving antenna coupled to said receiver, means for orienting said angularly orientable scanner along a radius of said polar plot corresponding with the directivity of said antenna, means for synchronizing substantially radial scanning of said scanner with variations of delay time of said delay line, and means for applying output signals derived from said receiver for actuating said recorder to mark said record receiving surface, at points selected by said scanner.

7. The combination in accordance with claim 1 wherein said recorder is arranged to record on a flat record receiving sheet, said scanner comprising an arm located in juxtaposition to one surface of said sheet and a device for scanning across said arm located in juxtaposition to the opposite surface of said sheet.

8. In combination, a directional range scanning distance measuring equipment comprising a normally inoperative pulse receiver, a pulse transmitter for transmitting periodic pulses, means for rendering said receiver operative for predetermined short intervals of time at predetermined times measured from the time of transmission of said pulses, means for scanning range to successively determine the presence of remote objects at a succession of ranges by continuously varying said times, a scanning recorder for periodically scanning successive angularly displaced substantially radial lines, means for synchronizing range scanning of said means for scanning range with scanning of each of said substantially radial lines by said recorder, means for varying the directivity of said distance measuring equipment, means for varying the angular position of said substantially radial lines in correspondence with said directivity, and means for applying pulses received by said receiver to said recorder for recording thereby.

9. The combination in accordance with claim 8 wherein said first and second means comprise a variable pulse delay line for delaying said periodic pulses, means for continuously varying the delay time of said delay line, and means for applying said pulses after delay by said delay line to render operative said pulse receiver.

10. In combination, a directional range scanning distance measuring equipment comprising a normally inoperative pulse receiver, means for rendering said receiver operative for predetermined short intervals of time, means for scanning range to successively determine the presence of remote objects at a succession of ranges by continuously varying the time positions of said short intervals of time, a scanning recorder for periodically scanning successive angularly displaced substantially radial lines, means for synchronizing range scanning of said range scanning distance measuring equipment with scanning of each of said radial lines by said recorder, means for varying the directivity of said distance measuring equipment, means for varying the angular position of said radial lines in correspondence with said directivity, and means for applying pulses received by said receiver to said recorder for recording thereby.

HYMAN HURVITZ.

REFERENCES CITED

The following references are of record in the file of this patent:

UNITED STATES PATENTS

| Number | Name | Date |
|---|---|---|
| 1,924,174 | Wolf | Aug. 29, 1933 |
| 2,403,562 | Smith | July 9, 1946 |
| 2,406,316 | Blumlein | Aug. 27, 1946 |
| 2,422,295 | Eaton | June 17, 1947 |
| 2,430,283 | Epstein | Nov. 4, 1947 |
| 2,430,307 | Smith | Nov. 4, 1947 |
| 2,467,202 | Gardiner | Apr. 12, 1949 |
| 2,492,120 | Smith | Dec. 20, 1949 |

FOREIGN PATENTS

| Number | Country | Date |
|---|---|---|
| 50,811 | Netherlands | July 16, 1941 |